US00RE50120E

(19) United States
(12) Reissued Patent
Mrozinski et al.

(10) Patent Number: US RE50,120 E
(45) Date of Reissued Patent: Sep. 10, 2024

(54) STATISTICAL PROJECTION FOR CONTROLLING BLER

(71) Applicant: Parallel Wireless, Inc., Nashua, NH (US)

(72) Inventors: Eric Mrozinski, Westford, MA (US); Romain Wiorowski, Olemps (FR)

(73) Assignee: Parallel Wireless, Inc., Nashua, NH (US)

(21) Appl. No.: 17/323,980

(22) Filed: May 18, 2021

Related U.S. Patent Documents

Reissue of:
(64) Patent No.: 10,917,856
Issued: Feb. 9, 2021
Appl. No.: 16/564,929
Filed: Sep. 9, 2019

U.S. Applications:
(60) Provisional application No. 62/792,565, filed on Jan. 15, 2019, provisional application No. 62/770,460,
(Continued)

(51) Int. Cl.
*H04W 52/20* (2009.01)
*H04B 17/309* (2015.01)
(Continued)

(52) U.S. Cl.
CPC ..... *H04B 17/309* (2015.01); *H04B 17/336* (2015.01); *H04W 52/12* (2013.01);
(Continued)

(58) Field of Classification Search
CPC . H04B 17/309; H04B 17/336; H04W 52/243; H04W 52/241; H04W 52/20; H04W 52/12
See application file for complete search history.

(56) References Cited

U.S. PATENT DOCUMENTS 5,914,950 A * 6/1999 Tiedemann, Jr. ..... H04L 47/14 370/348
6,173,162 B1 * 1/2001 Dahlman ..... H04B 7/2628 455/69
(Continued)

FOREIGN PATENT DOCUMENTS

WO WO-9858461 A1 * 12/1998 ..... H04B 7/2628

OTHER PUBLICATIONS

Rosa L. Figueroa, Qing Zeng-Treitler, Sasikiran Kandula, and Long H Ngo, "Predicting Sample Size Required for Classification Performance," BMC Med Inform Decis Mak. Feb. 15, 2012.

*Primary Examiner* — Luke S Wassum
(74) *Attorney, Agent, or Firm* — Michael Y. Saji

(57) ABSTRACT

Methods are disclosed for determining a block error rate (BLER) and determining if the BLER is significantly above, below or on BLER target. The method includes determining a pair of thresholds including an upper threshold and a lower threshold for a predetermined confidence level and determining a threshold in total number of blocks received. The method further includes determining a Required Compensation BLER from a number of bad blocks, a total number of blocks received and a maximum total number of blocks to receive for a purpose of statistical significance; comparing the Required Compensation BLER against the upper and lower threshold to determine if the BLER is significantly above the BLER target, below the BLER target or inconclusive; and, if the threshold in total number of blocks received is reached, then the inconclusive result is reinterpreted as the BLER being on target.

18 Claims, 10 Drawing Sheets

Related U.S. Application Data filed on Nov. 21, 2018, provisional application No. 62/728,726, filed on Sep. 7, 2018.

(51) Int. Cl.
*H04B 17/336* (2015.01)
*H04W 52/12* (2009.01)
*H04W 52/24* (2009.01)

(52) U.S. Cl.
CPC ..... *H04W 52/20* (2013.01); *H04W 52/241* (2013.01); *H04W 52/243* (2013.01)

(56) References Cited

U.S. PATENT DOCUMENTS 6,606,343 B2 8/2003 Zeira et al.
7,009,955 B2 3/2006 Koo et al.
7,106,700 B2 * 9/2006 Freiberg ..... H04W 52/32 370/335
7,162,262 B2 * 1/2007 Jonsson ..... H04W 52/12 455/226.1
7,496,376 B2 2/2009 Campo Camacho et al. ..... H04W 52/241 370/335
7,558,593 B2 * 7/2009 Medrano ..... H04W 52/12 370/335
7,707,474 B2 4/2010 Rinne et al.
7,853,284 B2 * 12/2010 Iwanaga ..... H04W 52/241 455/67.11
8,208,423 B2 * 6/2012 Liu ..... H04W 52/16 370/318
8,316,275 B2 * 11/2012 Oosuge ..... H04L 1/203 714/752
8,385,266 B1 2/2013 Vargantwar et al.
8,582,703 B2 * 11/2013 Luschi ..... H04W 52/241 370/252
10,624,041 B1 * 4/2020 Seely ..... H04B 17/345
10,917,856 B2 * 2/2021 Mrozinski ..... H04B 17/309
2002/0115443 A1 * 8/2002 Freiberg ..... H04L 1/0068 455/450
2003/0142632 A1 7/2003 Lin et al.
2004/0116142 A1 * 6/2004 Wang ..... H04L 1/0027 455/522
2004/0208385 A1 * 10/2004 Jiang ..... A61B 5/7264 382/254
2005/0083999 A1 4/2005 Koo et al.
2006/0053174 A1 * 3/2006 Gardner ..... G06F 16/38 707/999.203
2006/0079264 A1 4/2006 Gu et al. ..... H04W 52/12 455/69
2006/0084459 A1 4/2006 Phan et al.
2006/0126755 A1 * 6/2006 Itou ..... H04W 52/12 375/141
2006/0293075 A1 12/2006 Kansakoski et al.
2007/0042718 A1 2/2007 Camacho et al.
2007/0253366 A1 * 11/2007 Gabin ..... H04W 52/265 370/328
2008/0132184 A1 6/2008 Wan et al.
2008/0188258 A1 8/2008 Usuda et al.
2010/0029322 A1 2/2010 Englund et al.
2010/0041427 A1 2/2010 Hannu et al.
2011/0188458 A1 * 8/2011 Sebeni ..... H04W 24/08 370/329
2013/0010633 A1 1/2013 Ringstrom et al.
2013/0322349 A1 * 12/2013 Hosangadi ..... H04L 1/203 370/329
2014/0126443 A1 * 5/2014 Chizgi ..... H04W 52/0229 370/311
2014/0171081 A1 6/2014 Cozzo et al.
2015/0131466 A1 5/2015 Razaghi et al.

* cited by examiner

STATISTICAL PROJECTION FOR CONTROLLING BLER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO OTHER APPLICATIONS

This application claims priority under 35 U.S.C. § 119(e) to U.S. Provisional Pat. App. No. 62/728,726, filed Sep. 7, 2018, titled "Statistical Projection for Controlling BLER" which is hereby incorporated by reference in its entirety for all purposes; this application also claims priority under 35 U.S.C. § 119(e) to U.S. Provisional Pat. App. No. 62/770,460, filed Nov. 21, 2018, titled "Statistical Projection for Controlling BLER" which is hereby incorporated by reference in its entirety for all purposes; this application also claims priority under 35 U.S.C. § 119(e) to U.S. Provisional Pat. App. No. 62/792,565, filed Jan. 15, 2019, titled "Statistical Projection for Controlling BLER" which is hereby incorporated by reference in its entirety for all purposes. This application hereby incorporates by reference in their entirety for all purposes U.S. Pat. Pub. No. US20140133456, titled "Dynamic Multi-Access Wireless Network Virtualization" and published May 15, 2014, and U.S. Pat. Pub. No. US20150257051, titled "Federated X2 Gateway" and published Sep. 10, 2015. Additionally, the following documents are hereby incorporated by reference in their entirety for all purposes: U.S. patent application Ser. No. 15/721,728, titled "Handovers with Simplified Network Topology"; U.S. patent application Ser. No. 15/782,819, titled "X2 Brokering Between Inter-3GPP Release eNodeB's"; U.S. Pat. Pub. No. US20170273134A1, titled "IuGW Architecture"; and U.S. Pat. Pub. No. US20160044531A1, titled "Congestion and Overload Reduction".

BACKGROUND

Outer-loop power control (OLPC) is a key functionality of 3G for providing reliable transmission of user data (voice, packet), for assuring stability of a radio link (between UE and CWS), and also for minimizing power while assuring required QoS. Reliable transmission is required e.g. for achieving good voice quality. OLPC is one of the key elements for minimizing uplink power while allowing to provide required QoS, thereby optimizing spectral efficiency on the uplink and hence maxing out on the number of served users or maxing out on the uplink data rate for each user.

UMTS is a system that is limited by the uplink. Uplink capacity is more scarce than downlink capacity, which implies that the uplink is on the critical path to providing service to users. The OLPC that runs on a CWS controls quality and power on the uplink.

The OLPC's objective is to assure that users and their active user bearers are served with acceptable/requested quality (block error rate being on target), while utilizing as little power as possible. Any waste of power reduces the maximum number of users that a cell can serve, and in the worst case can destabilize the whole of the cell's uplink, thereby affecting all served users. OLPC is a fundamental functionality of a 3G cell. Any activity of any UE, or any condition that a UE is subject to, is subject to OLPC, and needs to be dealt with by OLPC. The use cases are a combination of any of below: Voice call setup, maintenance, release; PS call setup, maintenance, release; UE's proximity to the antenna (close, far, any); Uplink interference, by own-cell and other-cell UEs; Number of UEs served in parallel (small, mid, high); Propagation model (pedestrian, fast moving, stationary . . . ).

Definitions: ILPC: inner-loop power control; SIR: signal-to-interference ratio, in particular that of the UL DPCCH; PS: packet switched (data transfer); CS: circuit switched (data transfer), synonymous of a voice call; BLER: block error rate:=number of blocks received with CRC-error, divided by the total number of received blocks (received during a given (fixed or variable) period); TRCH, or transport channel: used here interchangeably for transport channel, radio bearer, radio access bearer, HSUPA MAC-d flow. Depending on the concept of OLPC, BLER is controlled for one or more of those.

Determination of BLER is relevant to performing OLPC. A method of determining BLER that is more sophisticated than a calculation of "#bad blocks/total #blocks" is desirable and needed, in particular the conclusion whether BLER is on, above or below target-BLER (Aspect of QoS)

SUMMARY

A method is described for generating a statistical projection for determining early on when a BLER range prediction is significantly off target. In one embodiment a method of determining a block error rate (BLER) and determining if the BLER is significantly above, below or on BLER target includes determining a pair of thresholds including an upper threshold and a lower threshold for a predetermined confidence level and determining a threshold in total number of blocks received. The method further includes determining a Required Compensation BLER from a number of bad blocks, a total number of blocks received and a maximum total number of blocks to receive for a purpose of statistical significance. The method additionally includes comparing the Required Compensation BLER against the upper and lower threshold to determine if the BLER is significantly above the BLER target, below the BLER target or inconclusive; wherein, if the threshold in total number of blocks received is reached, then the inconclusive result is reinterpreted as the BLER being on target.

In another embodiment, a method of determining a block error rate (BLER) and determining if BLER is significantly above, below or on BLER target includes determining a set of pairs of thresholds including an upper threshold and a lower threshold for a predetermined confidence level per pair; determining a maximum total number of blocks received; and determining a BLER from a number of bad blocks and a total number of blocks received. The method also includes comparing the BLER against a particular upper and lower threshold from the set of pairs of thresholds to determine if the BLER is significantly above the BLER target, below the BLER target or inconclusive and wherein, if the maximum total number of blocks received is reached, then the inconclusive result is reinterpreted as the BLER being on target.

DETAILED DESCRIPTION

Figure 1:
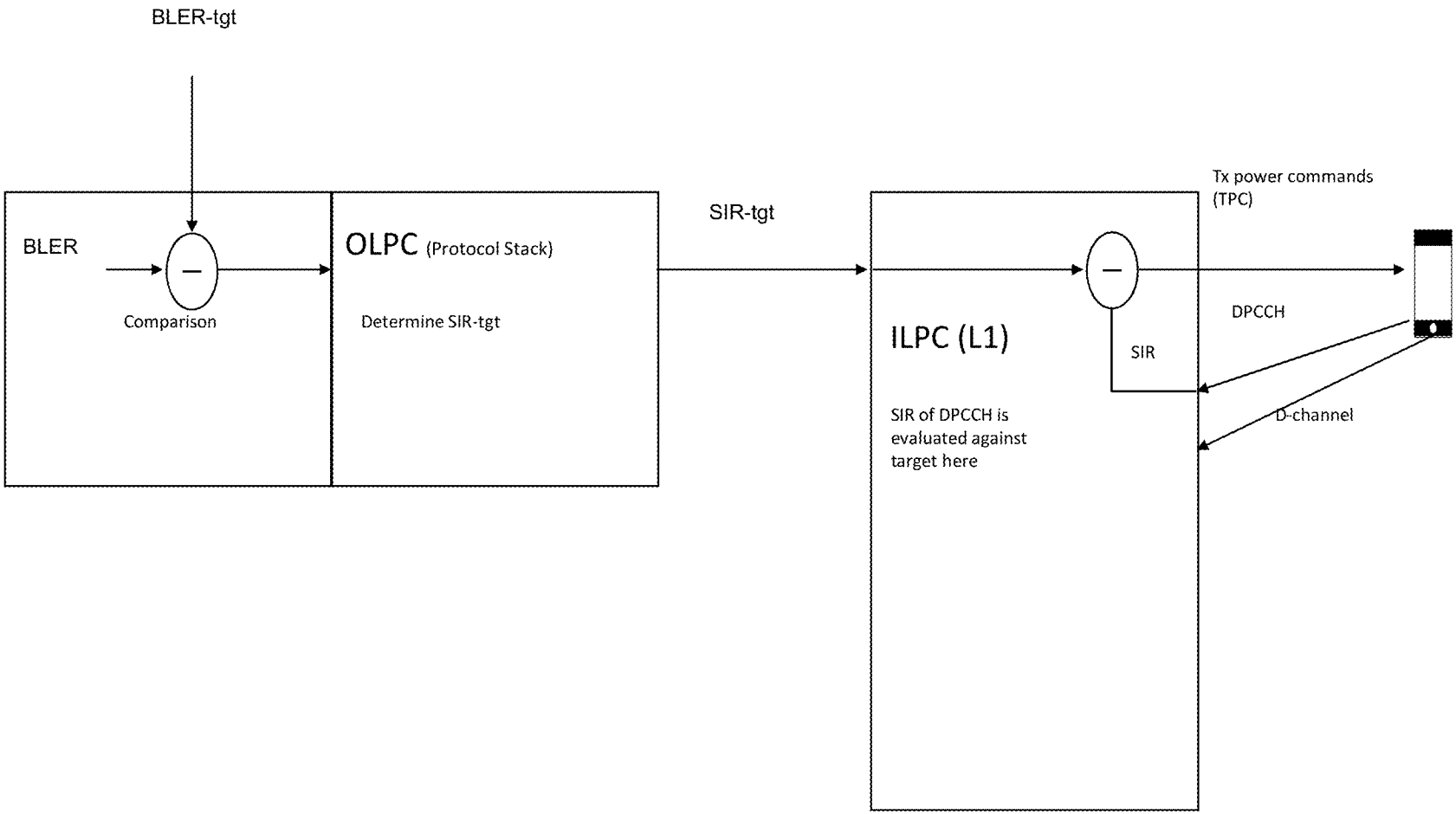
FIG. 1 is a block diagram showing components and steps for controlling BLER, in accordance with some embodiments.

FIG. 1 is a block diagram showing elements and steps for controlling BLER in one embodiment. The OLPC's essential job is to provide SIR-Target to L1, which OLPC modifies, based on each active TRCH's BLER versus its respective BLER-target, and also based on the reported (estimated) SIR.

Typically, OLPC can only control BLER if there is a direct, monotonic decreasing relationship between BLER and SIR-target (radio propagation conditions being constant), and if L1's ILPC fully takes effect: measured SIR~SIR-tgt. If this is not the case, OLPC cannot control BLER, and the problem cannot be addressed by changes in OLPC (not by change of parameters and certainly not by a change in the OLPC algorithms).

Figure 2:
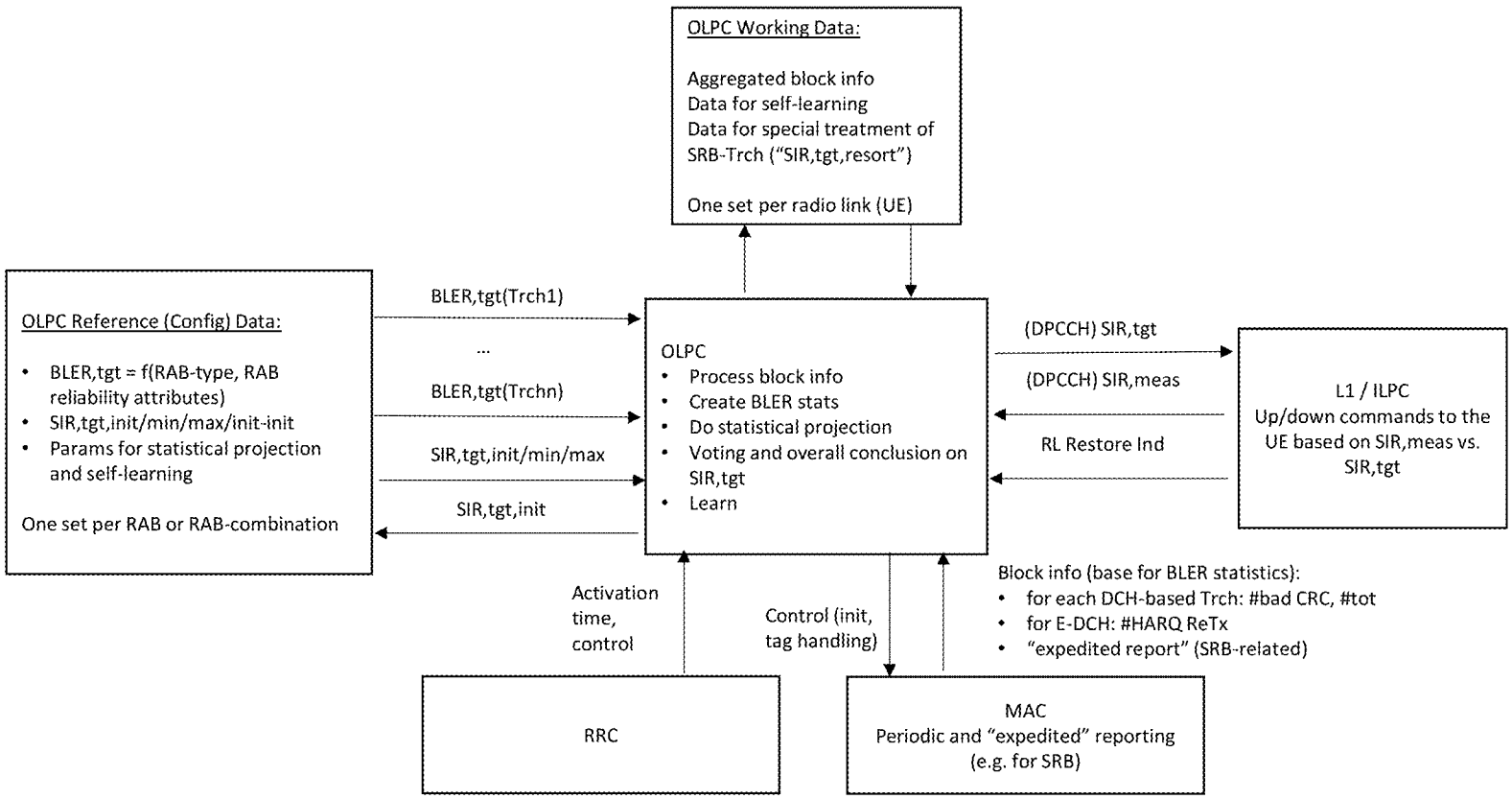
FIG. 2 is a block diagram showing the interaction of the OLPC with other entities, in accordance with some embodiments.

Interaction of OLPC with other entities/layers (L1, MAC, RRC) is illustrated in FIG. 2 (Solution Architecture). The requirements are that the corresponding interfaces and type of information exchanged are supported by those entities/layers. Some of them are defined by 3GPP (OLPC<>L1), others are left to company's discretion (e.g. OLPC<>MAC), depending on algorithm design.

Desirable features of an OLPC algorithm or software or hardware device or method would include: Generate and evaluate BLER statistics for each TRCH. Assure statistical significance of BLER by accumulation a high enough number of received blocks as base of calculating BLER (->informed voting, but slow . . . ). The slowness would be compensated for by statistical projection (-> . . . increase reaction speed). Assure that all of a UE's TRCHs' experiences a BLER<=BLER,tgt (block error rate as aspect of required QoS is met). In combination with suitable gain factors (beta-c and beta-d) for the active uplink physical data channels, the goal is BLER=BLER,tgt for all TRCHs at all times. For each TRCH, and based on its BLER vs. BLER-target: vote SIR-target up, down, maintain, or not-yet-conclusive). Conclude from per-TRCH voting on overall vote/decision: SIR,tgt: increase, decrease, maintain. Verify SIR,tgt (target) is kept within range of reported (actual) SIR. SIR-tgt=SIR,meas+/−δ. Verify that SIR,tgt is kept within range defined by min and max.

Figure 3:
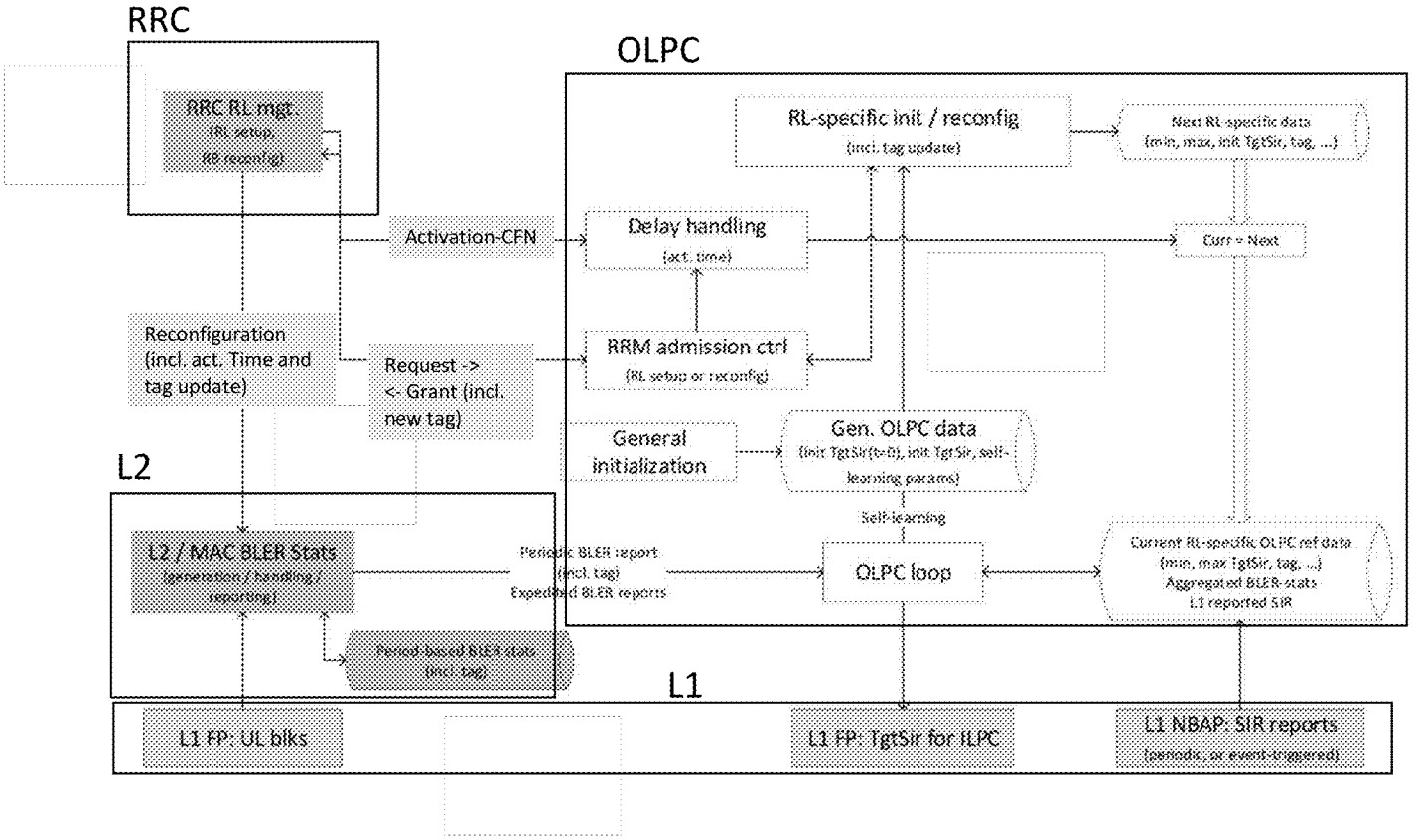
FIG. 3 is a block diagram showing components and steps for controlling BLER, in accordance with some embodiments

FIG. 3 is a block diagram showing elements and steps for controlling BLER in one embodiment. The task of OLPC, which is to control BLER for each TRCH, is subject to radio propagation conditions as main disturbing factor. OLPC has to react fact enough to this disturbance, to maximize power efficiency and maintain QoS and radio link stability. Determining/tracking of BLER has to fulfill two antagonistic requirements: BLER, or the conclusion on whether BLER is equal, below or above BLER-target, has to be reliable. False conclusions have detrimental effect on L1's operations (e.g. ILPC, HSUPA scheduling). And the conclusion has to be drawn fast, to react fast to changes in the propagation conditions. The purpose of statistical projection is to reconcile both requirements, by accepting a given certainty of conclusion while minimizing the statistical base for this conclusion (i.e. minimal number of received block upon which to conclude). This, along with other aspects not covered here, allows to react fast enough to changes in propagation conditions. We will see indirectly that the propagation conditions have changed based on changes to BLER while SIR-tgt is maintained unchanged. Currently we call OLPC once per second; the minimum reaction time could, however, be decreased.

Figure 4:
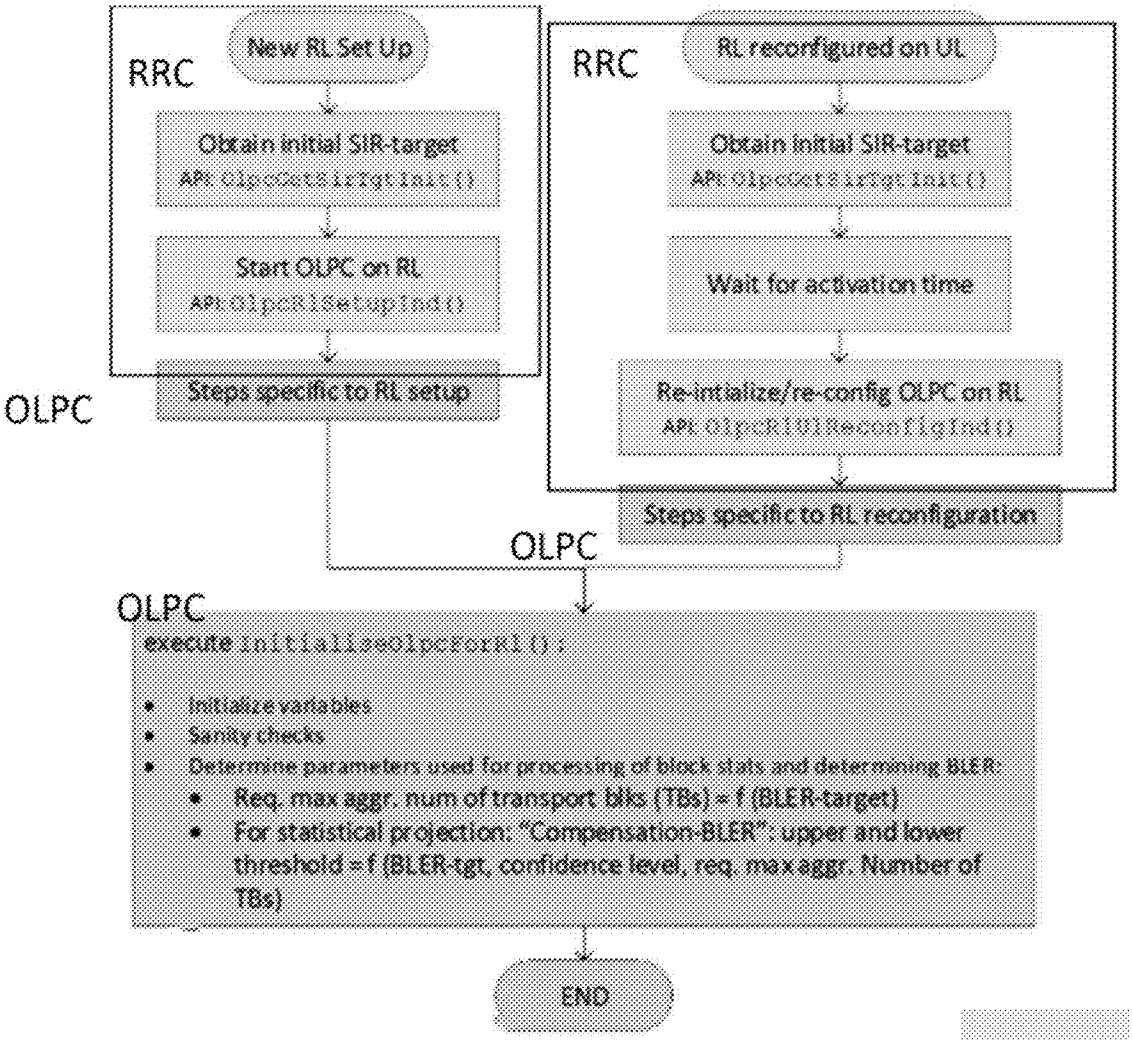
FIG. 4 is a block diagram showing components and steps for determining compensation BLER, in accordance with some embodiments.

FIG. 4 shows RRC inputs to OLPC (provided by the application): During RL setup or reconfiguration of an existing RL's uplink, among others: list of TRCHs and their respective BLER-target values; Periodic block and CRC-error count information (Block statistics e.g. once per second). Periodically reported SIR (report provided by L1); SIR-tgt min/max/init, which depend on the values chosen for various gain factors and power offsets that are in the hand of the application and not visible to OLPC. For this reason, the values need also defined on application level and passed down to OLPC.

Figure 5:
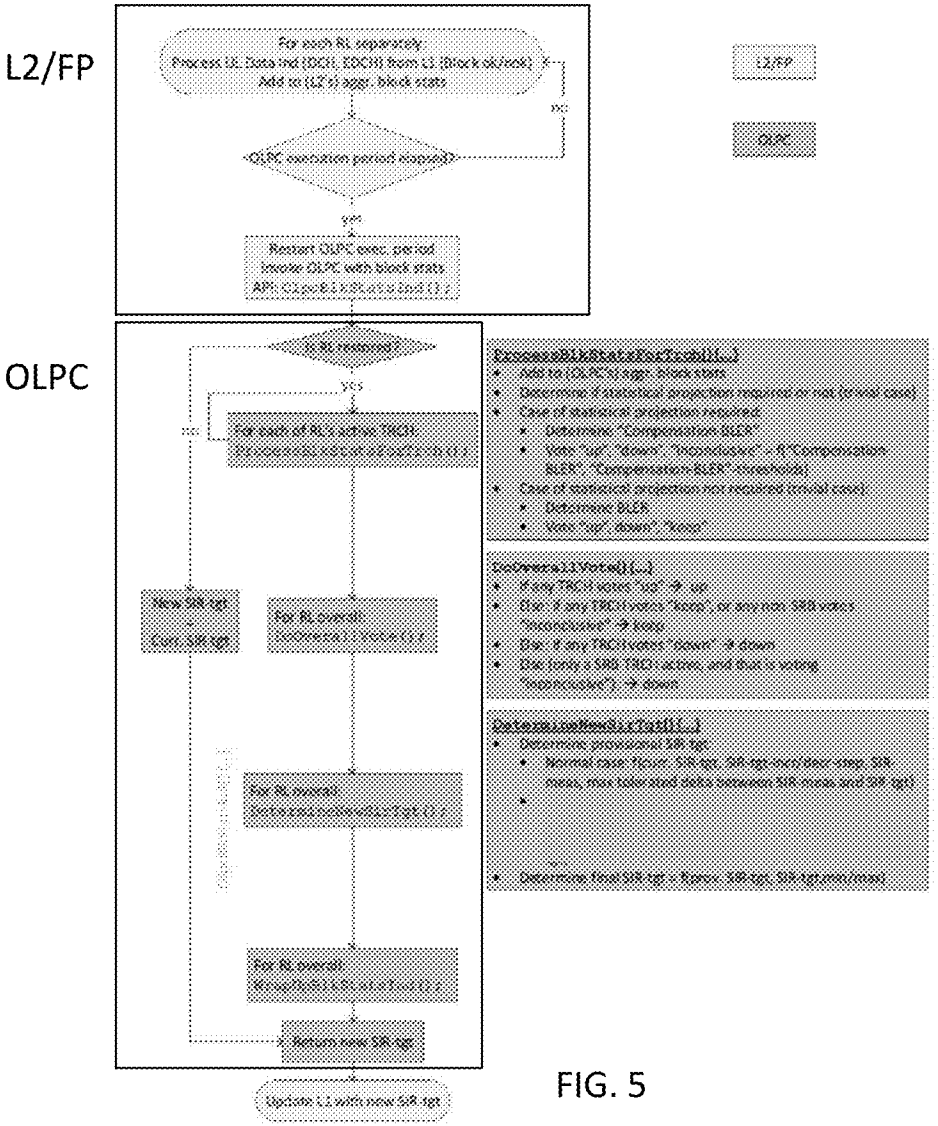
FIG. 5 is a block diagram showing components and steps for updating L1 with a new SIR target, in accordance with some embodiments.

FIG. 5 shows the output from OLPC (provided to the application): SIR-target (passed on to L1/ILPC).

Certain parameters may be provided as hard-coded. Of course any or all of these parameters could be provided during cell setup process using an appropriate application programming interface (API), or adjusted during run-time (even for an active radio link), by means of algorithms. One having skill in the art would appreciate the benefits of doing so. Examples of parameters that do not often change and would be suitable for hard coding would be: confidence level for BLER determination; hysteresis factor for assessing changes to SIR-target; increment and decrement step values; qualifying distance from SIR to SIR-target; SIR-RANGE min and max; BLER versus BLER-TGT hysteresis factor.

A set of ranges could be maintained, in some embodiments, where the ranges are used to conclude whether we are significantly above or below BLER-target, by comparing the calculated BLER, or some other quantity ("Required Compensation BLER") against respective thresholds, to conclude if the BLER is significantly above or below, or on target-BLERNote: Required Compensation BLER being the BLER that we would have to meet during the reception of the yet outstanding Blocks to receive. These thresholds can be determined based on a Bernoulli trial and binomial probability distribution, or by other means. BLER can be compared against Bernoulli distribution-based fluctuation interval (i.e. array of upper/lower thresholds), while Required Compensation BLER can be compared against a single pair of, or few upper/lower thresholds. For the approach of using calculated BLER and Bernoulli-based approach: since the uncertainty, and therefore also the range between upper and lower (max/min) thresholds decreases based on the #of blocks received, an array of ranges could be provided, each applying to a #of blocks received. For the approach of using "Required Compensation BLER", the #of blocks received is already influencing "Required Compensation BLER", so that a single pair of (max/min) thresholds suffices for any #of blocks received.

BLER, or Required Compensation BLER, is calculated using counters that are accumulated over time, as it is an aggregate statistic. A number of blocks received is counted and a number of block errors within that number of blocks received (such as blocks that failed to be decoded by the L1) are counted. A max threshold, MaxAggrTotNumBlks—how many blocks do you need at maximum to get to statistical significance—may be used to determine how many blocks must be counted. After we reach this number of blocks received, it is trivial to calculate the BLER by dividing successful decodes by total blocks. But the key is to decide if BLER is above, below or at BLER-target, early-on—that is, before we reach that maximum number of blocks. in case it deviates significantly from this target. At some point, block counters can be reset if appropriate to cause the stats counter to start aggregation from scratch. Therefore, once we reach the max threshold number of blocks received, in some embodiments, we may reset the accumulating block counter to collect a new set of blocks.

Stated differently, whether or not we have statistical significance is dependent on the number of blocks received, which itself is dependent on the data rate. So this method helps for low rate transfer more than high rate data transfer, where the number of blocks needed to get to statistical significance is rapidly reached due to the high data rate. This method therefore helps to make more accurate estimates of BLER within a short period of time using only a small number of blocks and/or at a low data rate. An extreme example is the channel used for speech call, which during discontinuous transmission (DTX) receives only 6 to 7 CRC-bearing blocks per second, which would require about 40 seconds worth of data to determine if BLER is above, below or on BLER-Target, in case of a simplistic approach in BLER determination.

Calculated BLER: BLER is calculated based on all the blocks we have received so far but not taking into account statistical significance. If we have 350 blocks left to receive before we can make a trivial decision, we may discover at block 51 that 10 are bad. That means our BLER is at 20%, but unclear whether statistically significant.

Required compensation BLER: Suppose, for purposes of argument, that our desired BLER target is 10%. (This is not a characteristic BLER; a good quality speech connection can be provided with a BLER of 0.8%.) If we receive 0 bad blocks out of 20, meaning all blocks received so far are good, we still have 10 "bad block credits" to hit a 10% BLER rate, with 80 blocks to go. To reach an overall BLER target of 10%, we must not exceed 10 bad blocks on the remaining 80 blocks. So the Required Compensation BLER is 10/80 or 12.5%. This value, compared to the pair of upper/lower thresholds, allows to conclude if BLER is (statistically) significantly above or below BLER-target, or not (yet) significantly off target.

A simple approach for adjusting SIR-target for control of BLER is to increment or decrement the value of SIR-tgt every fixed interval by some step value. However, these adaptations may not be fast enough in some cases, while in other cases those may happen pre-maturely, which may be characterized as high "nervousness" in steering the SIR-tgt. Instead, the present method is proposed.

In the present method, the base for statistical significance of a determined BLER, or the conclusion on whether BLER is above, below or on target, grows with each block received. We can compare BLER or Required compensation BLER to an upper and lower threshold (defining the fluctuation interval) and conclude whether we are above or below the target in statistically significant terms. Rather, thresholds that are based on statistically significant intervals are used, and these may be pre-calculated.

We can adjust the precision of this comparison (more precisely the confidence level applied to comparison & conclusion), which inversely affects the speed of coming to a conclusion. Intuitively, the higher the input value to the upper and lower value threshold determination, the more blocks we will need to come to a conclusion, to reach a higher confidence. This can be captured as a percentage or a decimal value (called here a "confidence level"). Increasing the confidence level results in an increasingly accurate and conclusion on BLER being above, below on BLER-tgt estimation, but it comes at the cost of requiring more blocks to be received to make the decision, and hence more time to react to changes of the disturbing quantity Determining BLER<BLER-TGT Below is based on a stochastical consideration, where you have a bucket with 5 black balls and 95 white balls (5% BLER). You're not aware of the actual BLER that the bucket has, i.e. you don't know that it's 5%. You blindly take one ball after the other, and happen to be "lucky" and pull continuously white balls (equivalent to no CRC error). How many white balls do you pull until you conclude with a certain degree of confidence, that the BLER is below 5%? That's the question that is addressed by what we call here "statistical projection".

Example

Input: Bler-tgt=5%

Input: confidence that the early conclusion on BLER<BLER-TGT is correct>=99.8%==>Odds of being incorrect<0.002 Below shows a sequence of white-ball draws (CRC OK), and shows for each drawing the likelihood of the sequence of drawings up to that point. The arrows indicate when the sequence of continuous white balls has a probability below 0.2%. This step serves as reference for the so-called compensation-BLER (here 16.67%), which specifies the BLER (BadBlk-Credit/RemainingTotal) that will be needed over the remaining drawings (representing the remaining total number of UL blocks), to compensate for the so far too low BLER of 0%. So when OLPC processes the data, this compensation-BLER is used as the higher threshold against which the ratio BadBlk-Credit/Remaining-Total is compared. If the ratio is above this comp-BLER, we can conclude with 99.8% confidence that BLER is below BLER-TGT. In some embodiments one could perform the "draw" with replacement or without replacement; with replacement is preferred.

| BadBlks Compensation- Odds BLER | TotalBlks | BadBlk-CreditRemaining | Total | | |
|---|---|---|---|---|---|
| 0 | 1 | 5.000 | 99 | 5.00% | 0.95 =95/100 |
| 0 | 1 | 5.000 | 98 | 5.05% | 0.902020202 = 95/100 * 94/98 |
| 0 | 1 | 5.000 | 97 | 5.10% | 0.855998763 = 95/100 * 94/98 * 93/97 |
| 0 | 1 | 5.000 | 96 | 5.15% | 0.811875116 = 95/100 * 94/98 * 93/97 * 92/96 |
| 0 | 1 | 5.000 | 95 | 5.21% | 0.769589953 |
| . . . | | | . . . | | |
| 0 | 1 | 5.000 | 33 | 5.26% | 0.003152395 |
| 0 | 1 | 5.000 | 32 | 15.15% | 0.002674759 |
| 0 | 1 | 5.000 | 31 | 15.63% | 0.002256828 |
| 0 | 1 | 5.000 | 30 | 16.13% | 0.001892824 <<<<<<< |

Determining BLER>BLER-TGT

This is analogous to above, but here, you blindly take one ball after the other, and happen to be "UNLUCKY" and pull continuously black balls (equivalent to CRC error). How many black balls do you pull until you conclude with a certain degree of confidence, that the BLER must be above 5%? That's the question that is addressed by what we call here "statistical projection".

Example

Input: Bler-tgt=5%

Input: confidence that the early conclusion on BLER<BLER-TGT is correct>=99.8%==>Odds of being incorrect<0.002

| BadBlks Compensation- Odds BLER | TotalBlks | BadBlk-CreditRemaining | Total | | |
|---|---|---|---|---|---|
| 1 | 1 | 5 | 100 | 5.00% | 0.05 = 5/100 |
| 1 | 1 | 4 | 99 | 4.04% | 0.002020202 = 5/100 * 4/99 |
| 1 | 1 | 3 | 98 | 3.06% | 6.18429E−05 = 5/100 * 4/99 * 3/98 <<<<<<< |

In some embodiments, a confidence level can be used to specify or characterize the likelihood/odds that an early conclusion ("statistical projection") is correct. Background: if we observe in a more or less early phase, that BLER is significantly higher or lower than BLER-target, and if conditions for statistical significance are met, we can take an early conclusion for SIR-target adjustment. Application: the higher the value, the more exact the projection, but the longer it takes to react. If you want OLPC to react faster to block errors or lack thereof, reduce the confidence level.

The SIR-target can be incremented or decremented in configurable step sizes.

Figure 6:
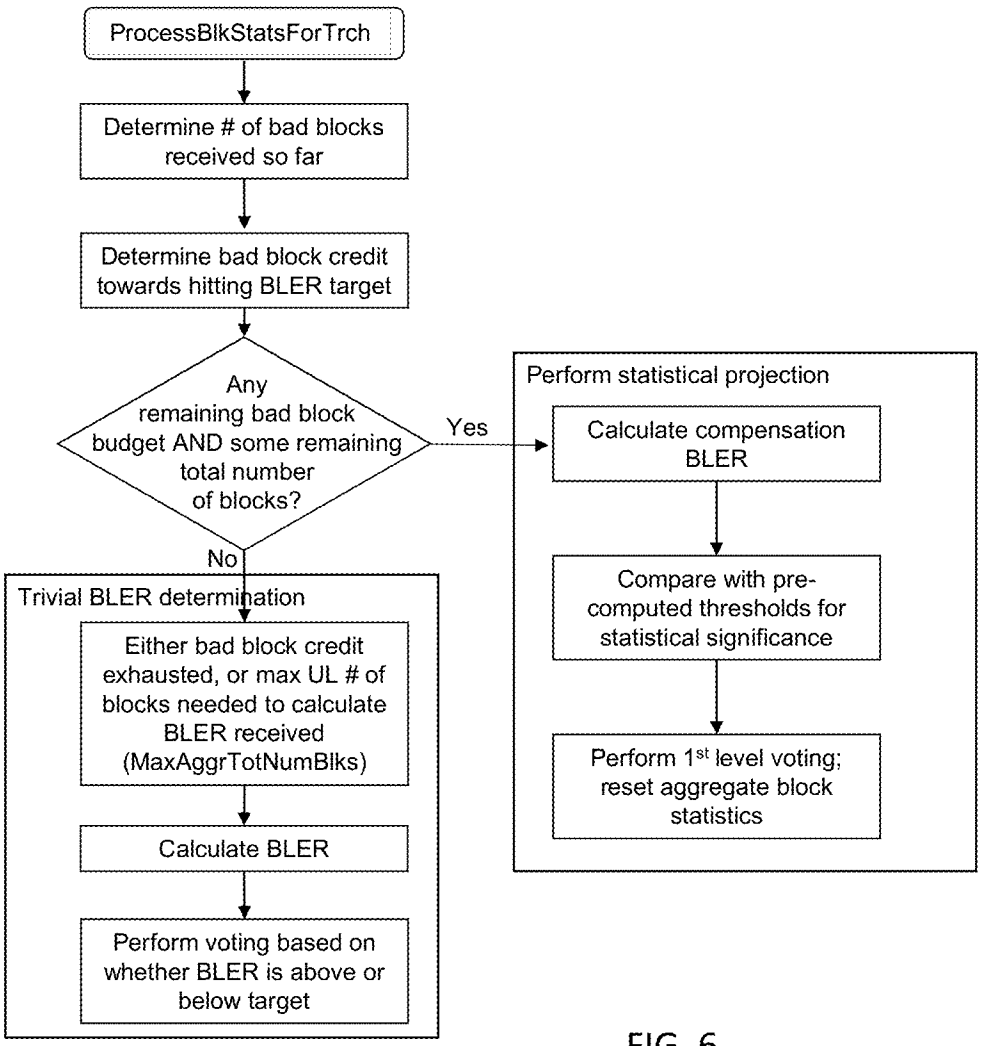
FIG. 6 is a flow diagram showing steps for performing voting, in accordance with some embodiments.

Referring to FIG. 6, a two-level voting algorithm can be used to determine SIR-target. Each channel in the set of TRCHscan get a vote, such that the SIR-tgt may be increased if more channels would benefit from an increase in SIR-tgt than would be harmed (or decreased if more channels would benefit than would be harmed from such a decrease). In some embodiments we may evaluate BLER significance and take a first-level vote for each TRCH ("TRCH-vote"). The $2^{nd}$-level (overall) vote is based on consideration of the individual (TRCH-specific) $1^{st}$ level votes. The basic principle is to overall-vote for an increase of SIR-target if at least one $1^{st}$ level vote is for an increase, and to decrease SIR-target if all $1^{st}$ level votes are in favor of a decrease. Variations, and more elaborate overall decisions can be made, based on the a $1^{st}$ level vote of an individual channel still being inconclusive (BLER not significantly above, below or on target), or e.g. based on the need for special handling of a critical TRCH with scarce amount of transmission data (e.g. the signaling radio bearer (SRB) TRCH used for signaling)

Execution of the overall vote is straightforward, but with two exceptions: 1.) SIR is not tracking SIR-target and way too low (out of bound), for whatever reason(!). In this case, and if BLER is too high, SIR-target is kept constant. After all, it is the too low SIR that is causing too high BLER, and not a too low SIR-target (SIR-target is higher than SIR!). 2.) SIR is not tracking SIR-target and way too high (out of bound), for whatever reason(!). In this case, and if BLER is too low, SIR-target is kept constant. After all, it is the too high SIR that is causing too low BLER, and not a too high SIR-target (SIR-target is lower than SIR!). In case a.) where reported SIR is way too low but BLER is too low (counter-intuitive but possible), SIR-target is reduced. In case b.) where SIR is way too high and BLER too high, SIR-target is increased. One idea may be in case a.) to reduce SIR-target radically to the level of reported SIR. After all, the BLER is too low even at that low level of SIR. So why bring SIR-target down in individual steps? Analogous though for case b.) . . . The deliberate decision is to go in small steps, to avoid too radical changes of SIR-target, which can cause quite some havoc in ILPC and HSUPA scheduling. Also, the counter-intuitive level of BLER may be only very short-lived, and actually not caused by the level of SIR. For example, high BLER can appear due to some error in procedure execution or wrong setting of initial UL power . . . even by ciphering problem(?). So better not to overdo and have OLPC too excited about moving SIR-target around.

In some embodiments, a MAX_QUALIFYING_DISTANCE_SIR_TO_SIR_target value can be used for assuring that SIR-target is only changed if appropriate, i.e.: increased only if reported SIR was not way below SIR-target. If SIR cannot follow SIR-target (for whichever reason), the solution is to NOT increase SIR-target, because the too low SIR is the cause for BLER>BLER-target, not a too low SIR-target; and decreased only if reported SIR was not way above SIR-target. If SIR cannot follow SIR-target (for whichever reason), the solution is NOT to decrease SIR-target, because the high low SIR is the cause for BLER<BLER-target, not a too high SIR-target.

MAX_QUALIFYING_DISTANCE_SIR_TO_SIR_target can be chosen to be as small as possible but as large as necessary. The value has to take into account how well ILPC is capable of keeping SIR on SIR-target. If SIR is found to be following SIR-target at a distance of up to +/−1 dB, the value needs to be set such that the SIR-target can gain at a minimum a slight bit more than the distance of 1 dB from reported SIR. Taking into account SIR_target_INCR_STEP and SIR_target_DECR_STEP (currently both at 0.5 dB), MAX_QUALIFYING_DISTANCE_SIR_TO_SIR_target should be set to at least 0.6 dB (value 6). Else SIR-target adjustment does not work deterministically: it could remain unchanged where it shouldn't (e.g. SIR always 1 dB below SIR-target). In other words, assure that both equations are valid: MAX_QUALIFYING_DISTANCE_SIR_TO_SIR_target+SIR_target_INCR_STEP>typical deviation/lagging of SIR relative to Sirtarget; and MAX_QUALIFYING_DISTANCE_SIR_TO_SIR_target+SIR_target_DECR_STEP> typical deviation/lagging of SIR relative to Sirtarget.

In some embodiments, BLER may be considered too high or low if Bler>Blertarget*(1+HystFactor) or Bler<Blertarget*(1−HystFactor), respectively.

Additional embodiments of the present application are contemplated. In some embodiments and alternatives thereto, the following features could be implemented.

1. Act on UL DPCCH decoding errors (TFCI decoding problems reported by L1), if suitable . . . that is, if it is proven that those can be prevented by increasing SIR,tgt.

2. Cope with the speed at which the propagation model can change (based on test with a fading simulator). Changing the reaction speed of OLPC is done through adjustment of already existing factors/parameters: increase and decrease step sizes; the rate at which OLPC is called by L2/FP with new block statistics. Currently OLPC execution rate is 1/sec; and reduce the confidence level used for statistical projection. However, changing the values comes at a cost of more "nervousness" of SIR-tgt values (faster and more pronounced change), which can make L1's life more difficult (also for the HSUPA scheduler). Also, current overlaying problems in L1, which results is very strong (too strong) variation of BLER, overshadows any change of BLER that would result from change of propagation conditions.

3. "Self-Learning": optimize SIR,tgt,init over time (->increase power efficiency by avoiding transients after RL setup or reconfig). The process of determining the initial SIR-tgt value can be done manually as well, and it has some advantages.

4. Apply CRC also to zero-blocks and SID blocks (e.g. TF0 config) (->e.g. further increased speed in obtaining statistical significance in particular for speech during DTX periods). This allows in principle to determine statistically significant BLER faster, which helps increase reaction speed to changes in propagation conditions. But the OLPC's feature of determining statistically significant BLER and doing statistical projection is typically sufficient.

A method is described for alternative BLER (block error rate). The mathematically precise model and process is based on the Bernoulli distribution of bad blocks. In this application, a set of prediction intervals can be determined for a given confidence level.

A prediction interval is determined for each given total number of blocks received. The interval is characterized by two values: the high and low bound of the interval, which serve as thresholds for concluding if the block error as a measured quantity is significantly above or below the BLER-target (expectation value), or neither of both.

For a total number of blocks received (thus far), if the number of bad blocks received exceeds the higher threshold, the block error rate (BLER) is concluded to be (statistically significantly) above target. This conclusion is made with a certain confidence level (e.g. Confidence Level 70%). If the number of bad blocks received is below the low threshold, the BLER is concluded to be (significantly) below target—again with certain confidence that this conclusion is correct. The terms prediction interval, confidence interval, and fluctuation interval are used interchangeably The basis for determining the prediction interval is the probability mass function for a Bernoulli distribution:

$$f(k, n, \rho) = \Pr(k, n, \rho) = \binom{n}{k} * \rho^k * (1 - \rho^{n-k})$$

The prediction intervals are determined as follows:

For a given total number of blocks received (n), determine the smallest value of k (number of bad blocks) for which following equation is met. That value 'k' represents the lower threshold of the confidence interval. 'p' specifies the BLER-target.

$$\text{Aggregate Probability} = \Sigma_{k=1}^{n} f(k,n,p) > 1 - \text{Confidence Level}$$

For a given n (total number of blocks received), determine the largest value of k (number of bad blocks) for which following equation is met. That value 'k' is the higher threshold of the confidence interval.

$$\text{Aggregate Probability} = \Sigma_{k=1}^{n} f(k,n,p) < \text{Confidence Level}$$

Because OLPC evolves around BLER and BLER-target, it is important to focus on the confidence interval in the "BLER-domain" rather than number of bad blocks.

Figure 7:
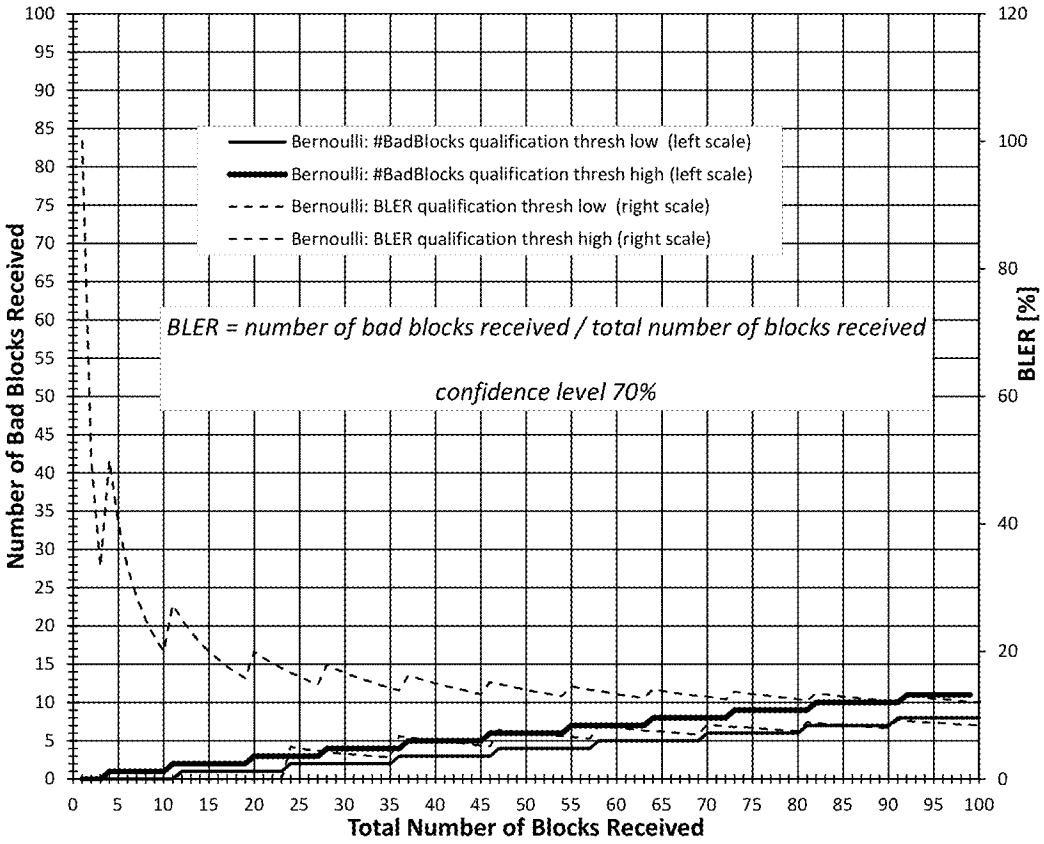
FIG. 7 is a graph showing higher and lower thresholds in number of bad blocks, in accordance with some embodiments.

FIG. 7 shows the higher and lower thresholds in number of bad blocks, and because BLER is defined as <number of bad blocks>/<total number of blocks received>, each prediction interval in "number of bad blocks" has a corresponding prediction interval in "BLER", which is also illustrated.

Figure 8:
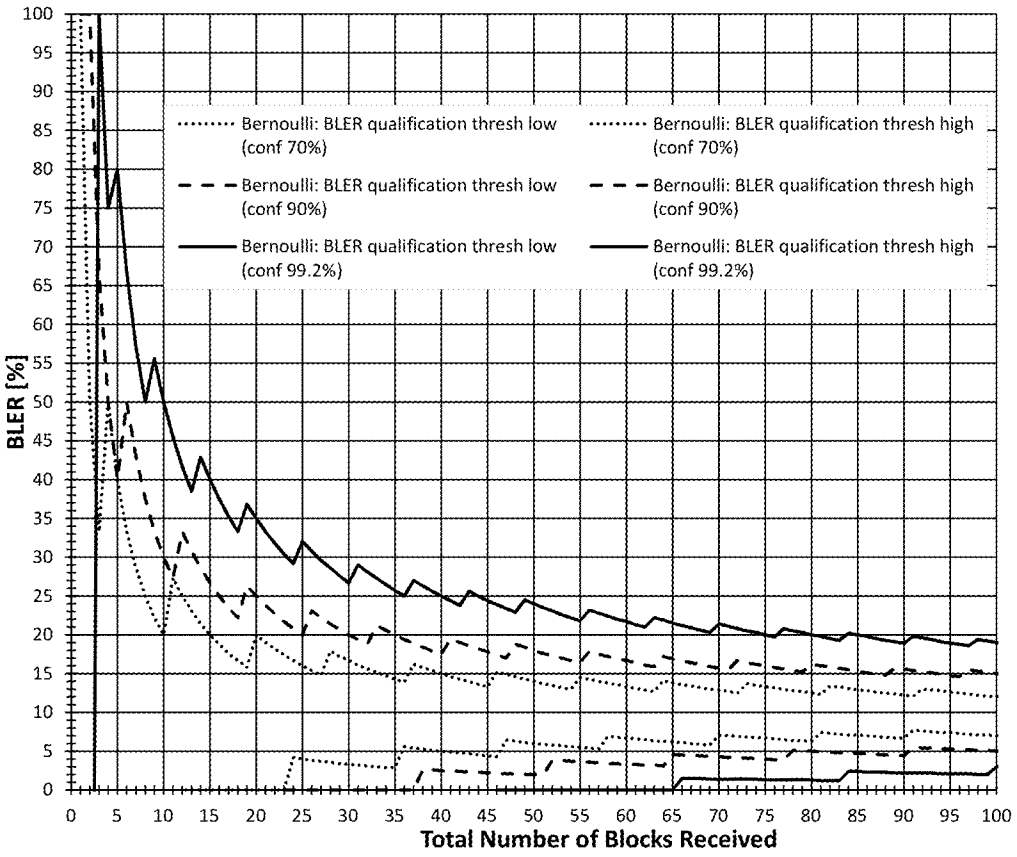
FIG. 8 is a graph showing prediction values for different confidence levels, in number of bad blocks, in accordance with some embodiments.

FIG. 8 shows for information purposes the prediction intervals for confidence levels 70%, 90% and 99.2%—all based on a BLER-target of 10%. Two characteristics can be highlighted:

- the prediction interval (space between lower and upper bound) shrinks as the total number of received blocks increases.
- the interval shrinks with each additional block received. As a result, smaller deviations of the measured BLER (or number of bad blocks) from BLER-target can lead to conclusion of BLER being significantly above or below BLER-target.

The approach of a Bernoulli distribution and prediction interval is precise means of concluding if measured BLER is above or below BLER-target. But it has following disadvantages:

- It requires quite some calculation. A simplification compared to above "Aggregate Probability" is possible, though. But still, it is heavy on calculation.
- It requires storing a whole array of intervals for each BLER-target that OLPC is operating with (one pair of upper and lower threshold for each <total number of blocks received>, which serves as look-up table during operation. One look-up table per value of BLER-target. Each look up table contains between 100 and 1000 pairs of thresholds.

The presented alternative method of determining how BLER relates to BLER-target uses only a single pair of thresholds, while it provides a pragmatic approximation to the Bernoulli-based approach.

Figure 9:
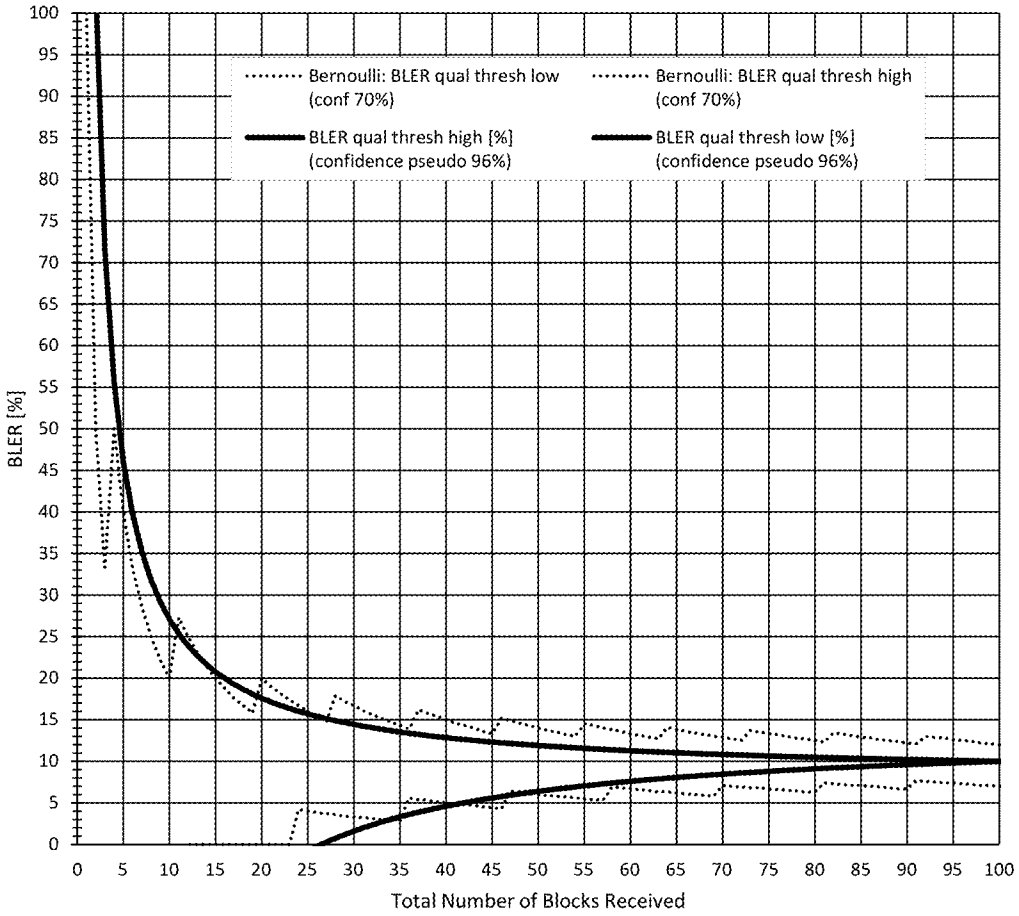
FIG. 9 is a graph showing shows an example of a confidence interval compared to the Bernoulli based prediction interval, in accordance with some embodiments.

FIG. 9 shows an example of the confidence interval determined with the alternative method (blue lines), and compares it to the Bernoulli based prediction interval:

The underlying concept/formula is:

"RequiredCompensationBLER" =

$$\frac{\text{BadBlockCreditLeft}}{\text{\#BlocksLeftToReceive}} = \frac{\text{BlerTarget} * \text{\#MaxTotalBlocksToReceive} - \text{\#BadBlocksReceived}}{\text{\#MaxTotalBlocksToReceive} - \text{\#TotalBlocksReceived}}$$

Application: the process of concluding

"Required Compensation BLER">UpperThreshold'==>> BLER is below BlerTarget

"Required Compensation BLER"<LowerThreshold'==>> BLER is above BlerTarget

LowerThreshold' and UpplerThreshold' are the values derived based on already described method with drawing and no replacing! One single pair of values for a given BLER-target The alternative prediction interval shown as curves in the chart of FIG. 9 and can be deduced from above equations:

$$\text{if BLER} = \frac{\text{\#BadBlocksReceived}}{\text{\#TotalBlocksReceived}} > \frac{\text{BlerTarget}}{\text{Progress}} - \text{LowerThreshold}' * \left(\frac{1}{\text{Progress}} - 1\right)$$

==>>BLER is above BlerTarget $$\text{if BLER} = \frac{\text{\#BadBlocksReceived}}{\text{\#TotalBlocksReceived}} < \frac{\text{BlerTarget}}{\text{Progress}} - \text{UpperThreshold}' * \left(\frac{1}{\text{Progress}} - 1\right)$$

==>>BLER is below BlerTarget with:

$$\text{Definition Progress} = \frac{\text{\#TotalBlocksReceived}}{\text{\#MaxTotalBlocksToReceive}}$$

Note that both terms $$\frac{\text{BlerTarget}}{\text{Progress}} - \text{Lower(Upper)Threshold}' * \left(\frac{1}{\text{Progress}} - 1\right)$$

represent the upper (respective lower) thresholds for each <total number of block received>, but those are only used for illustrating the prediction intervals that result from this alternative approach. They are not determined—neither offline nor during runtime. Instead, all that is done in runtime is to determine one-off the single pair of thresholds ("LowerThreshold"' & "UpperThreshold"'), and determine "Required Compensation BLER" and comparing it against LowerThreshold' and UpperThreshold', as described above.

The most obvious difference between the precise Bernoulli-based approach and the alternative BLER determination is that latter shows a prediction interval zero when #TotalBlocksReceived equals #MaxTotalBlocksToReceive (in above graph value 100), while the Bernoulli-based prediction interval closes up on the BLER-target asymptotically (it never reaches width zero). In other words, in Bernoulli-based, there is always some degree of uncertainty left in determining if BLER is below or above BLER-target.

The alternative approach in contrast always ends up with a decision, unless further measures are taken. Such a measure can be to introduce a BLER-target-RANGE which replaces the discrete single (!) value of BLER-target. The reasoning behind this is that OLPC doesn't need to keep BLER exactly on a single-value BLER-target (and in fact never will). Rather, OLPC can content itself with keeping BLER close enough to BLER-target:

$$\frac{\text{BlerTarget}}{\text{BlerTargetRangeFactor}} \leq \text{BLER} \leq \text{BlerTarget} * \text{BlerTargetRangeFactor}$$

With BlerTargetRangeFactor>1

Figure 10:
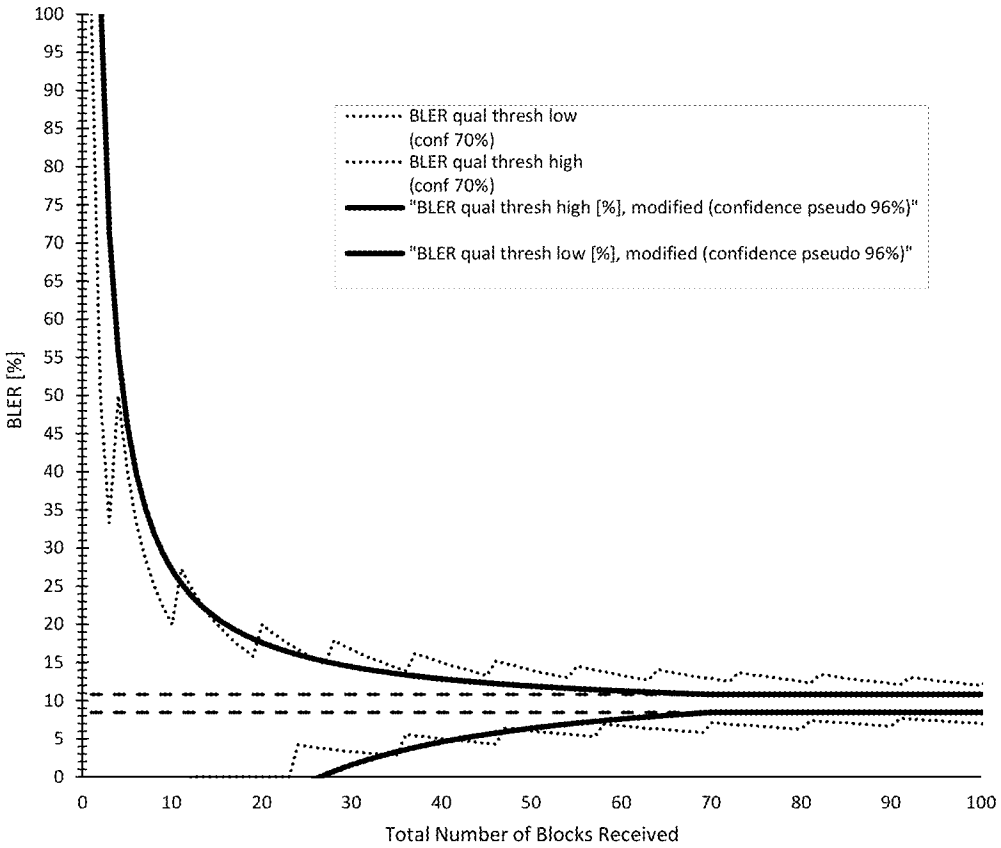
FIG. 10 is a graph showing higher and lower thresholds with modified confidence levels, in accordance with some embodiments.

The solution could look as shown in the graph of FIG. 10.

The modified/enhanced prediction interval for the alternative prediction—as illustrated above—is based on either of both below equations:

$$\frac{\text{BlerTarget}}{\text{Progress}_{\text{cutoff}}} - \text{LowerThresh}' * \left(\frac{1}{\text{Progress}_{\text{cutoff}}} - 1\right) = \text{BlerTarget} * \text{BlerTargetRangeFactor} \qquad \text{Equation 1}$$

$$\frac{\text{BlerTarget}}{\text{Progress}_{\text{cutoff}}} - \text{UpperThresh}' * \left(\frac{1}{\text{Progress}_{\text{cutoff}}} - 1\right) = \frac{\text{BlerTarget}}{\text{BlerTargetRangeFactor}} \qquad \text{Equation 2}$$

Using equation 1, it is fulfilled for:

$$\text{Progress}_{\text{cutoff}} = \frac{\text{BlerTarget} - \text{LowerThresh}'}{\text{BlerTarget} * \text{BlerTargetRangeFactor} - \text{LowerThresh}'}$$

As an example, on which above illustrated modified/enhanced prediction interval is based:

LowerThreshold=8.1%=0.081

BlerTargetRangeFactor=1.08

BlerTarget=10%=0.1

#MaxTotalBlocksToReceive=100

→Progress,cutoff=(0.1−0.081)/(0.1*1.08−0.081)=0.7

→#TotalBlocksReceived, cutoff=70

In words, if by the time 70 blocks are received, BLER is not concluded to be above or below target, we conclude that BLER is on target ("close enough to BLER-target"). This allows to reset the block counters and start fresh, thereby speeding up the OLPC's reaction time should the propagation conditions change and require OLPC to identify this condition and react swiftly, by changing SIR-target.

The equation discussed above allows to determine the value for Progress,$_{cutoff,qualBLER<tgt}$: when the corresponding number of blocks are received (i.e. #TotalBlocksReceived,$_{cutoff,qualBLER<tgt}$), if the determined BLER is in the range between <(exact) BLER-tgt> and <(exact) BLER-tgt>/<BlerTargetRangeFactor>, we conclude that BLER is "on target", and if BLER is below that range, we conclude that BLER is "below target". This allows to reset the block counters and start fresh, thereby speeding up the OLPC's reaction time should the propagation conditions change and require OLPC to identify this condition and react swiftly, by changing SIR-target.

The advantages of this modified/enhance prediction interval are:

- less nervousness, because the conclusion is not necessarily ultimately "above" or "below" BLER-target, but can be "close" to target, implying that all is well and OLPC can keep SIR-target unchanged.
- in cases where BLER is around BLER-target: quicker wrap-up of a sequence of evaluations (i.e. conclusion and re-initializing the statistics i.e. block counters) and start of a new sequence of evaluations. This allows OLPC to react faster should in the meantime the propagation conditions have changed. Note: starting on a blank page allows changes in propagation conditions to have a faster effect in the statistics, if they carry less "legacy" (analogous to more narrow-band filtering)

The Bernoulli-approach (mathematically precise) results in a (large) number of pairs of upper/lower thresholds (a set): one pair for each number of received blocks. The set depends on the specific BLER-target and on the chosen confidence level. In this approach, the determined <BLER> is compared against the applicable pair of thresholds. This results in one single pair of upper/lower thresholds that is valid for "any number" of received blocks, a specific BLER-target and a specific confidence level. In this approach the determined <Required Compensation BLER> is compared against the single pair of thresholds. The term "any number" may not always be correct, there is a "cut-off TotalNumOfBlocksReceived", beyond which another (2nd) pair exists.

Various alternative embodiments are also contemplated by the inventors. For example, the inventors have understood and appreciated that, as power control in other wireless radio access technologies such as 4G LTE and 3GPP 5G (each of which is well-known at the time of filing) also depends on accurate and rapid estimation of BLER, the present techniques and methods could be used to efficiently and rapidly determine an estimated BLER for these other RATs and standards as well, with the details of specific power control loop control structures being adapted to the relevant power control standards for each other RAT. Accordingly, the inventors do not limit the use or application of the present invention to the 3G or UMTS standard.

The protocols described herein may be optimized for greater or lesser latency, for more or fewer mesh nodes, for more or fewer data streams, and other alternatives. In some embodiments, these optimizations may be performed at the base station, at the virtualization server, within a function performing radio resource allocation and coding selection, or at another location. In some embodiments, a virtualization server may identify and initiate power adjustments to improve channel quality.

In some embodiments, the mesh network nodes may provide complete or partial guesses at what paths are the optimal or best paths during a particular time interval, and may be enabled to send messages back to the virtualization server to communicate these complete or partial guesses.

In some embodiments, the base stations described herein may be compatible with a UMTS protocol, a Long Term Evolution (LTE) radio transmission protocol, or another air interface. The base stations may be nodeBs, or eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the 3G UMTS protocol, the base stations may also support other air interfaces, such as HSPA, LTE, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention.

The invention claimed is:

1. A method of determining a block error rate (BLER) and determining if the *determined* BLER is *significantly* above, *significantly* below or on *a* BLER target comprising;

determining a pair of thresholds including an upper threshold and a lower threshold for a predetermined confidence level;

determining a threshold in total number of blocks received;

determining a Required Compensation BLER from a number of bad blocks, a total number of blocks received and a maximum total number of blocks to receive for a purpose of statistical significance; *and* comparing the Required Compensation BLER against the upper and lower threshold to determine if the *determined* BLER is *significantly* above the BLER target, *significantly* below the BLER target or *an* inconclusive *result*;

wherein, if the threshold in total number of blocks received is reached, then the inconclusive result is reinterpreted as the BLER being on target.

2. The method of claim 1 wherein the pair of thresholds are valid for any number of received blocks, a specific BLER target, and a specific confidence value.

3. The method of claim 1 wherein the *determined* BLER is determined from a number of bad blocks divided by a total number of blocks received.

4. The method of claim 1 wherein the Required Compensation BLER is calculated by determining a first value by subtracting a total number of blocks received so far from the maximum number of blocks to be received and dividing a total number of bad blocks allowed by the first value.

5. The method of claim 1 wherein the threshold for the total number of blocks received is calculated by determining a first value by subtracting the lower threshold from the BLER target, determining a second value by multiplying the BLER target by a BLER target range factor and subtracting the lower threshold from the result, and dividing the first value by the second value.

6. The method of claim 1 wherein when the *determined* BLER is significantly above the BLER target then increasing a Signal to Interference Ratio (SIR) target*; wherein when the determined BLER is significantly below the BLER target then decreasing the SIR target; and wherein when the determined result is an inconclusive result then maintaining the SIR target at a current level*.

[7. The method of claim 1 wherein when the BLER is significantly below the BLER target then decreasing a Signal to Interference Ratio (SIR) target.]

8. The method of claim 1 further comprising resetting block statistics.

9. A method of determining a block error rate (BLER) and determining if BLER is *significantly* above, *significantly* below or on *a* BLER target comprising:

determining a set of pairs of thresholds including an upper threshold and a lower threshold for a predetermined confidence level per pair;

determining a maximum total number of blocks received;

determining a BLER from a number of bad blocks and a total number of blocks received; *and* comparing the BLER against a particular upper and lower threshold from the set of pairs of thresholds to determine if the BLER is *significantly* above the BLER target, *significantly* below the BLER target or *an* inconclusive *result*;

wherein, if the maximum total number of blocks received is reached, then the inconclusive result is reinterpreted as the BLER being on target.

10. The method of claim 9 wherein the [pair] *set of pairs* of thresholds are valid for any number of received blocks, a specific BLER target and a specific confidence value.

11. The method of claim 9 wherein the BLER is determined from a number of bad blocks divided by a total number of blocks received.

12. The method of claim 9 wherein the threshold for the total number of blocks received is calculated by determining a first value by subtracting the lower threshold from the BLER target, determining a second value by multiplying the BLER target by a BLER target range factor and subtracting the lower threshold from the result, and dividing the first value by the second value.

13. The method of claim 9 wherein when the BLER is significantly above the BLER target then increasing a Signal to Interference Ratio (SIR) target*; wherein when the BLER is significantly below the BLER target then decreasing the SIR target; and wherein when the determined result is an inconclusive result then maintaining the SIR target at a current level*.

[14. The method of claim 9 wherein when the BLER is significantly below the BLER target then decreasing a Signal to Interference Ratio (SIR) target.]

15. The method of claim 9 further comprising resetting block statistics.

*16. A non-transitory computer-readable medium containing instructions for determining a block error rate (BLER) and determining if the BLER is significantly above, significantly below or on a BLER target which, when executed, cause a system to perform steps comprising:*

*determining a pair of thresholds including an upper threshold and a lower threshold for a predetermined confidence level;*

*determining a threshold in total number of blocks received;*

*determining a Required Compensation BLER (RBLER) from a number of bad blocks, a total number of blocks received and a maximum total number of blocks to receive for a purpose of statistical significance; and*

*comparing the RBLER against the upper and lower threshold to determine if the BLER is significantly above the BLER target, significantly below the BLER target or an inconclusive result,*

*wherein, if the maximum total number of blocks received is reached, then the inconclusive result is reinterpreted as the BLER being on target.*

*17. The non-transitory computer-readable medium of claim 16 further storing instructions wherein the pair of thresholds are valid for any number of received blocks, a specific BLER target, and a specific confidence value.*

*18. The non-transitory computer-readable medium of claim 16 further storing instructions wherein the BLER is determined from a number of bad blocks divided by a total number of blocks received.*

*19. The non-transitory computer-readable medium of claim 16 further storing instructions wherein the Required Compensation BLER is calculated by determining a first value by subtracting a total number of blocks received so far from the maximum number of blocks to be received and dividing a total number of bad blocks allowed by the first value.*

*20. The non-transitory computer-readable medium of claim 16 further storing instructions wherein the threshold for the total number of blocks received is calculated by determining a first value by subtracting the lower threshold from the BLER target, determining a second value by multiplying the BLER target by a BLER target range factor and subtracting the lower threshold from the result, and dividing the first value by the second value.*

* * * * *